United States Patent [19]
Vysma

[11] Patent Number: 5,794,389
[45] Date of Patent: Aug. 18, 1998

[54] HURRICANE HOME SHELTER

[76] Inventor: Erwin L. Vysma, 8701 Oasis Ave., Westminster, Calif. 92683

[21] Appl. No.: 585,904

[22] Filed: Jan. 16, 1996

[51] Int. Cl.[6] .................................................. E02D 27/32
[52] U.S. Cl. ........................ 52/169.6; 52/64; 52/126.5; 52/126.6
[58] Field of Search ....................... 52/169.6, 169.1, 52/126.6, 126.5, 64

[56] References Cited

U.S. PATENT DOCUMENTS

| | | |
|---|---|---|
| 2,189,486 | 2/1940 | D'Amico .......................... 52/169.6 X |
| 2,653,468 | 9/1953 | Rowles ............................. 52/169.6 X |
| 2,792,794 | 5/1957 | Miller .............................. 52/169.6 X |
| 3,008,435 | 11/1961 | Dupuy ............................. 52/169.6 X |
| 3,858,371 | 1/1975 | Averill ............................. 52/169.6 X |
| 4,747,242 | 5/1988 | Aarstad ........................... 52/169.6 X |

*Primary Examiner*—Christopher Kent

[57] ABSTRACT

A sheltering form of encapsulation with a mechanism to place the house into safety and means of covering, during the threat of destruction by a violent wind.

12 Claims, 8 Drawing Sheets

HURRICANE HOME SHELTER

BACKGROUND OF THE INVENTION

1. Field of the Invention

This invention relates to sheltering structures particularly for residential, commercial, as well as light industrial purposes, and has as its general object a provision for protection against hurricanes.

2. Description of the Prior Art

In one prior art teaching, we see that it deals with a two level structure for parking self propelled vehicles (automobiles) and storing of relatively light goods. It is an object of the present invention to provide an underground structure and one vertically moving platform (not two) to provide shelter for a stationary building (immovable object) of rather heavy weight. As such the advantage of the present invention does not require the stationary building to be propelled or self-propelled away from said structure or platform on a daily basis, which may cause cyclic fatigue of the lifting mechanism, and its power source. Premature cyclic fatigue failure of said lifting mechanism and its power source may require periodic replacement before it comes crashing down, resulting in total destruction of said stationary building. Also the present invention does not require the sophisticated water sealing arrangement that is required for these two level parking structures. All these factors may account for the fact that they have not been constructed and put into every day use.

In a bomb proof structure the primary consideration is making the structure capable of withstanding the energy impulse of an exploding bomb. This is of course, even more critical when nuclear or thermo-nuclear devices are considered. In most of the prior art teachings, the movable cover, due to its design and construction for its intended use, require an opening and closing mechanism with a high degree of sophistication. It is an object of the present invention to reduce the above mentioned problems by providing a simple covering such as a water proof and tear proof tarpaulin, or other simple operated equivalent.

In an other typical prior art teaching the movable cover is provided a circular opening of rather large proportion to allow the chimney and all the plumbing vents to exhaust its smoke and noxious gasses through the circular opening into the outer atmosphere, as to dealing with the problem of properly ventilating the building when it is in the lowered position. Such opening may cause flooding of the shelter.

Therefore it is an object of the present invention to reduce the above mentioned problems by providing a shutter that covers the entire opening of the shelter for the specific effects of a hurricane such as: storm surge(wall of water), wind, rain and wind borne debris.

It is another object of the present invention to raise the level of the rim to historically known flood levels or above, as to deal with such storm surge and or rain induced floods It is yet another object of the present invention, to berm up the excavated soil to the edge of the rim as to provide a natural landscape profile to buffer the covered shelter from wind and wind borne debris. It is a further object of the present invention to provide a lifting mechanism annex building foundation structure, whereby said lifting mechanism can lift said building to uppermost position and said building foundation structure can be engaged to a fixed support, so that said lifting mechanism can be disengaged, and subsequently lowered for necessary inspection, and servicing. Non of the Prior Art Teachings has dealt with this safety feature.

It is yet a further object of the present invention to provide for a Utility Room as an integral part of the Shelter, whereby said Utility Room can function as the control room as well as a shelter for the occupants and their pets.

SUMMARY, RAMIFICATIONS AND SCOPE

Accordingly the reader will see that the sheltering of a home by the present invention, can be accomplished repeatedly. Furthermore the Hurricane Home Shelter has additional advantages in that:

- it provides the ability to practice the "sheltering procedure" until the occupants are thoroughly familiar with all phases and the execution time be reduced to a practical and short duration;
- it can be built for a new housing track;
- it can be built for retrofit in existing housing tracks.

Although the descriptions above and the following, contains many specificities, these should not be construed as limiting the scope of the invention but as merely providing illustrations of some of the present embodiments of this invention. For example lowering a house in a shelter and covering the open end of the shelter is a form of encapsulating a house. Encapsulation can come in different forms for instance: A dome can be placed over a fixed and stationary structure or house. A dome can have various shapes, a square or rectangular box, a semi sphere etc. Shapes are not important the strength and the function for the various effects of a hurricane is important. An encapsulation can be made up of loose components such as: Four or more masts can be secured on anchor pads on the outer perimeter of the house. Shielding or encapsulating material can be wrapped around or attached to these masts to form a wall around the house. The open top can be left open or closed with similar shielding or encapsulating materials. Wrapping or attaching these shielding or encapsulating materials directly to the house can also be construed as a ramification or scope of the present invention. These forms of encapsulations or sheltering have the benefit of not needing to build a shelter/basement and a mechanism to lowering it and covering it. Depending on the various intensities of hurricanes any one of the above mentioned Home Sheltering/Encapsulation may be sufficient to spare a house/building from hurricane effects.

Thus the scope of the invention should be determined by the appended claims and their legal equivalents, rather than by the examples given.

DESCRIPTIONS OF THE PREFERRED EMBODIMENTS

Figure 1:
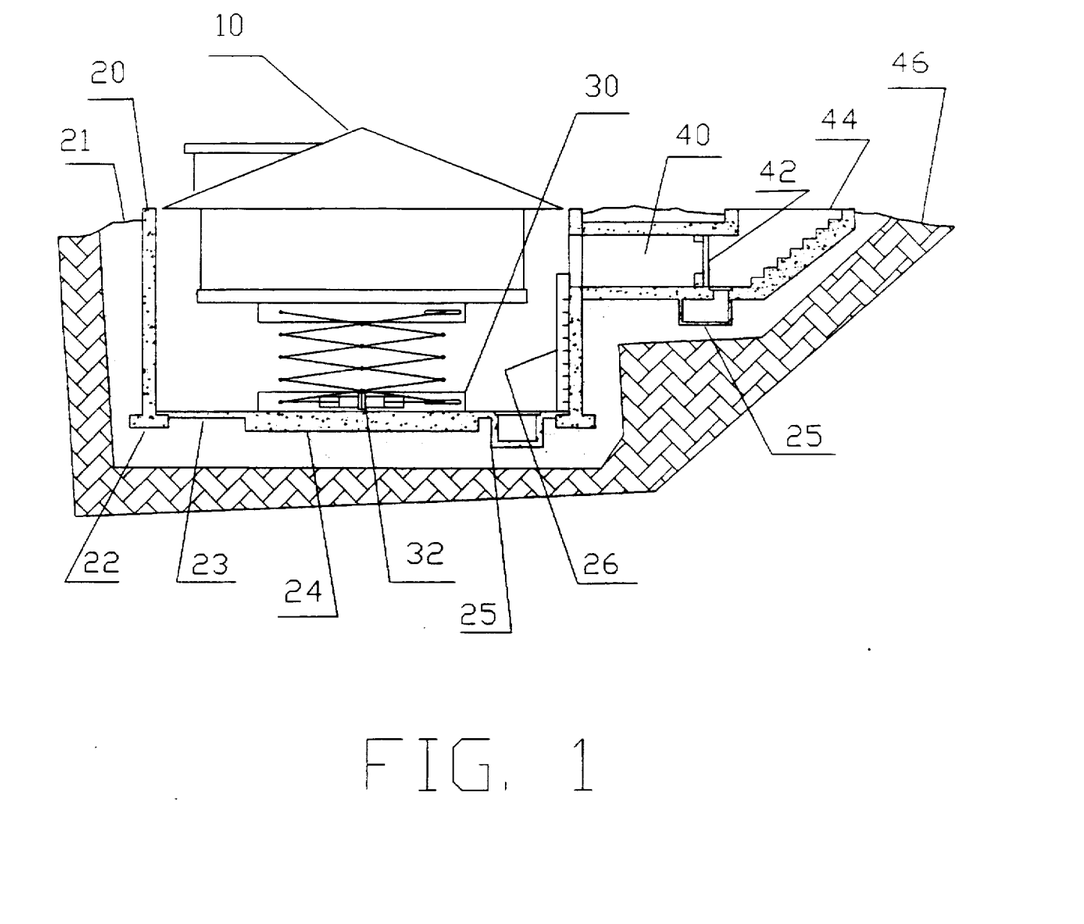
FIG. 1 shows the underground concrete shelter in a sectional-elevation view.

Referring to FIG. 1, as an example of one form of embodiment of present invention, I have shown a combined building and shelter structure embodying a building 10, supported by lifting mechanism indicated generally at 30 and a shelter housing structure indicated generally at 20.

The housing wall 20, which is preferably of reinforced concrete, is surrounded (around and below) by a high permeable back fill 21, such as sand and gravel. The wall 20 is supported by the footing 22, also of reinforced concrete, includes a floor slab indicated generally at 23, and integrally a machinery foundation at 24. Combined, the walls 20 and floor 23 cooperate to define a main central room, which receives the building 10 when the latter is lowered for protection against hurricanes. A sump 25 of certain volume is provided in the central room as well as in portal of the utility room, to collect inadvertent rain/water seepage into the shelter. A submersible pump, which will automatically function when a predetermined amount of water collects in the sump, will be provided. A steel ladder, indicated at 26, is provided to give access form the utility room down to the shelter floor for inspection and service.

The Utility Room generally indicated at 40, will house the power source to activate the lifting mechanism generally indicated at 30, which is actuated by hydraulic cylinders indicated at 32. The power source is suggested to be hydraulic pump and reservoir. The controls to lower and raise is an integral part of the power source. Also as a safety feature an electric power generator should be installed in this utility room as "standby" during power outage. It can be driven by a gasoline or diesel engine, with a snorkel-like air intake and exhaust. This utility room will have "quick-dissconnects" at easy reach of all utilities such as electricity, gas water, telephone and sewage drain with safety switch. This safety switch prevents untimely actuation of the lifting mechanism. The utility room indicated at 40 has an access door generally indicated at 42. It is a water tight steel door, making it a water tight compartment. The utility room must have all standard utilities that the house has. A concrete stairway generally indicated at 44 is provided a steel canopy that can double as a cover when lowered. With the rim of the shelter 20 at or above known flood levels the excavated soil can be burmed-up to the rim generally indicated at 46.

Figure 2:
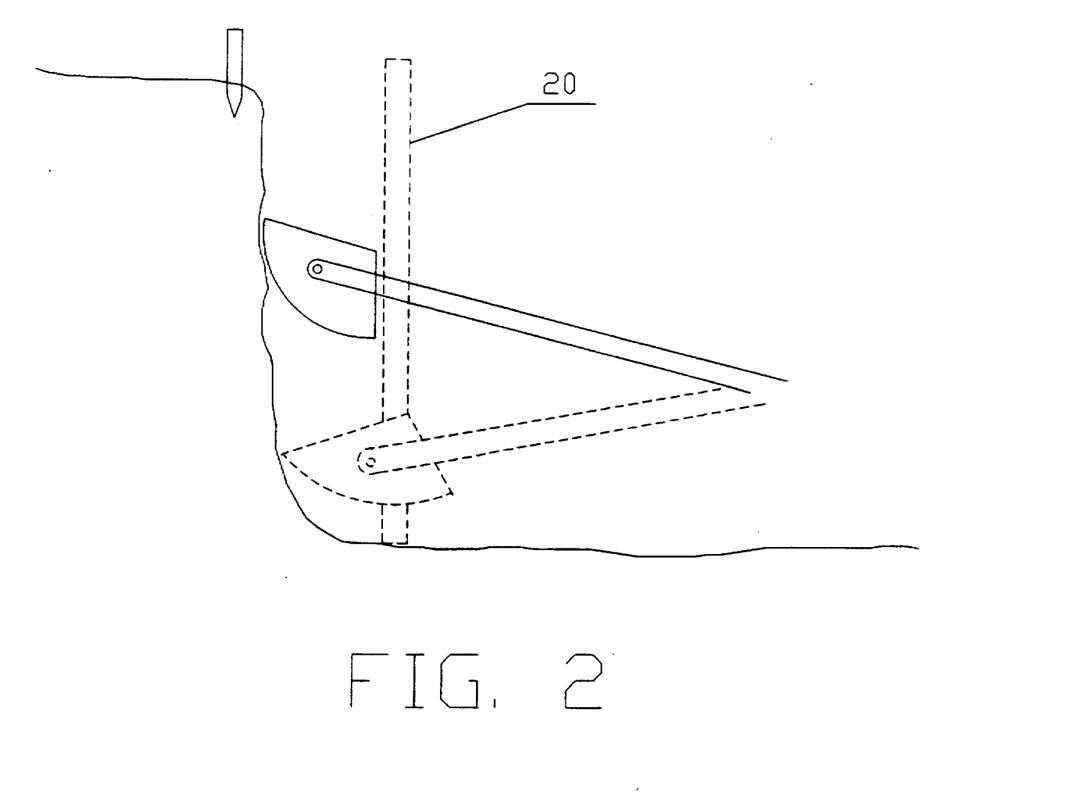
FIG. 2 shows the allowance of an extra 4-feet work space all around the excavation for building and waterproofing the walls.

Referring now to FIG. 2, what is shown is the shelter wall indicated at 20 and the importance of excavating an extra 4 feet work space all around for building and water proofing said wall.

Figure 3:
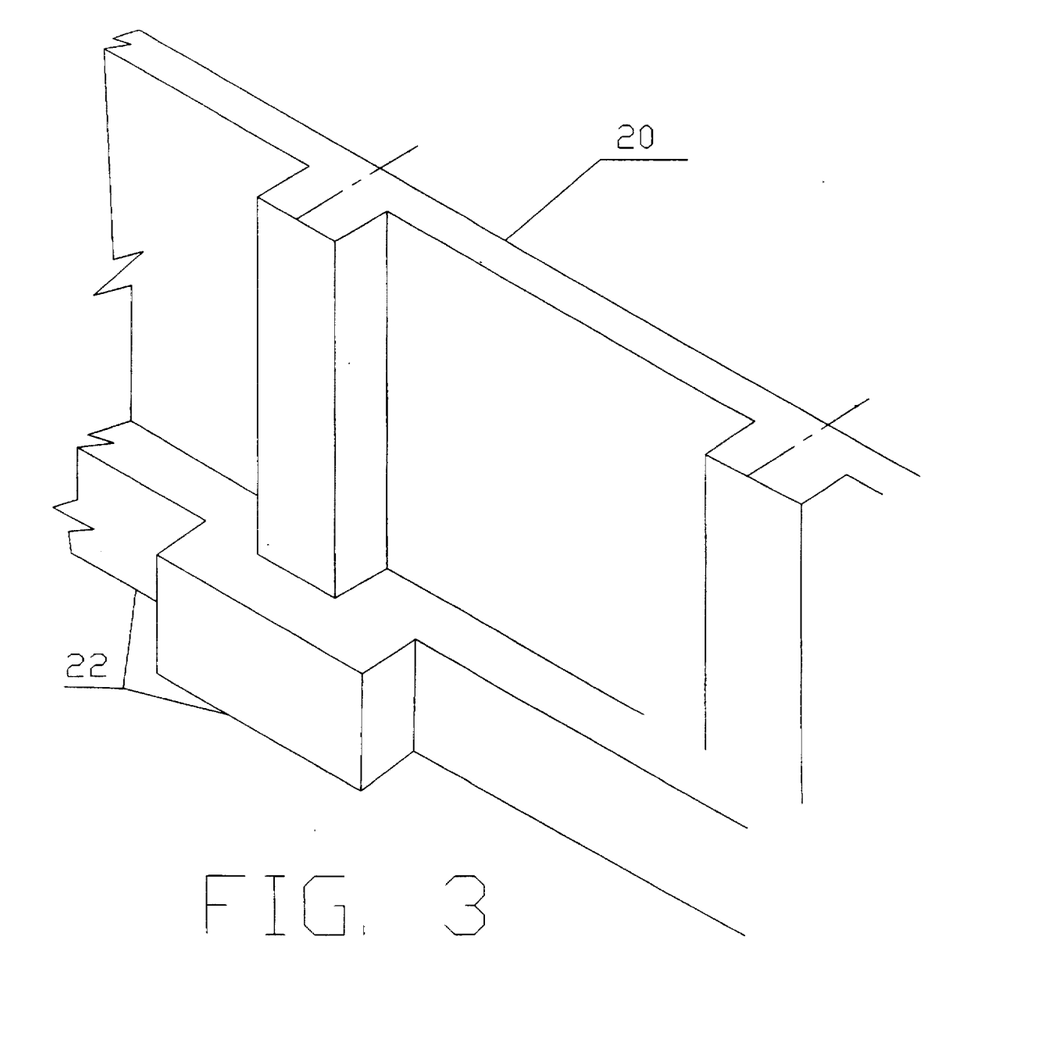
FIG. 3 shows the standard practice of reinforcing subterranean walls with pilasters at certain intervals.

Referring also to FIG. 3, what is shown is shelter wall 20 with pilaster reinforcements supported by a seamless footing generally indicated at 22.

Figure 4:
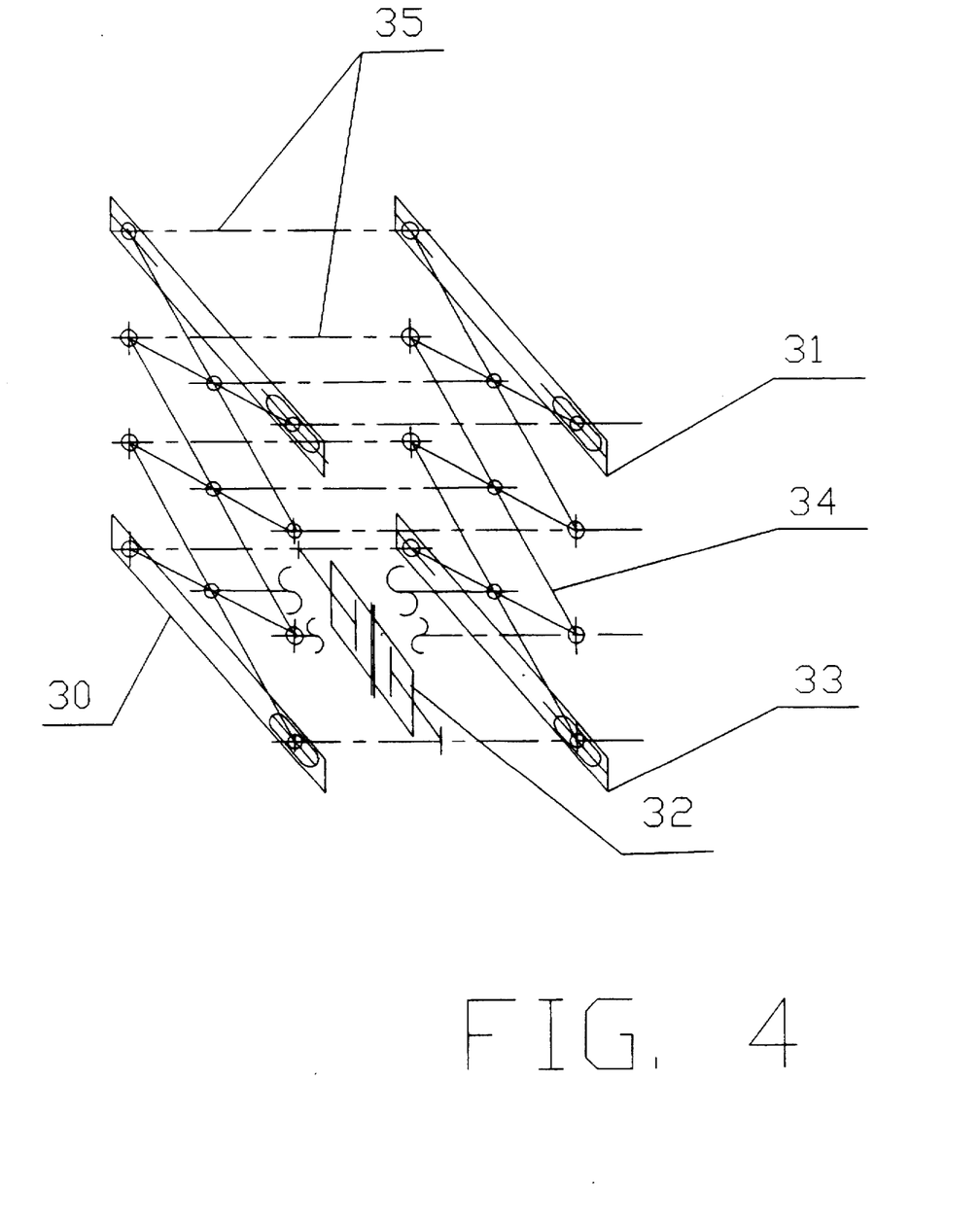
FIG. 4 shows a scissors lift actuated by a pair of hydraulic cylinders mounted back to back.

Referring now to FIG. 4, what is shown is the lifting mechanism generally indicated at 30, consisting of a stationary base 33, a motion base 31, linked together by scissors like brackets indicted at 34, and inter-connected by shafts 35. The lifting mechanism is actuated by hydraulic cylinders generally indicated at 32.

Figure 5:
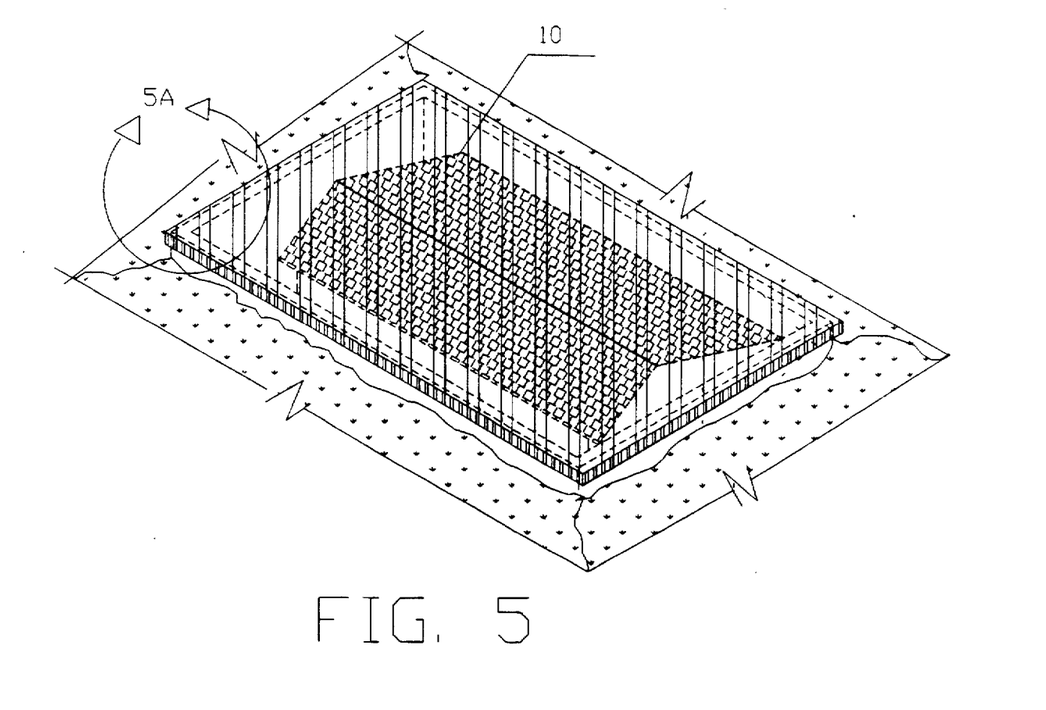
FIG. 5 shows the covering of the open pit when house is down.

Referring to FIG. 5, what is shown is the house/building 10 in its lowest position and protected by cover 50.

Figure 5A:
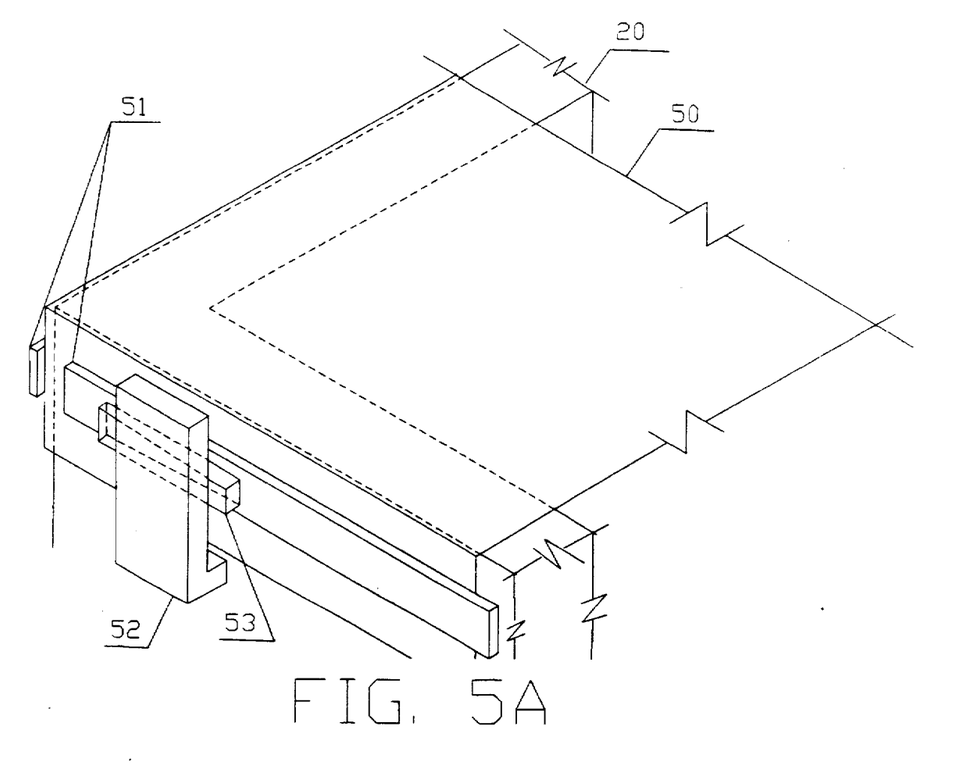
FIG. 5A shows in detail how the covering is secured.

FIG. 5A is a corner detail taken from FIG. 5 and shows in detail a tarpaulin cover 50 draped and drawn tightly around shelter wall 20 and secured with clamping bars 51 placed all around. The wedges 53, when properly placed between brackets 52 and clamping bars 51, will secure the covering 50 in place. Note: this low profile covering is wind and water proof.

Figure 6:
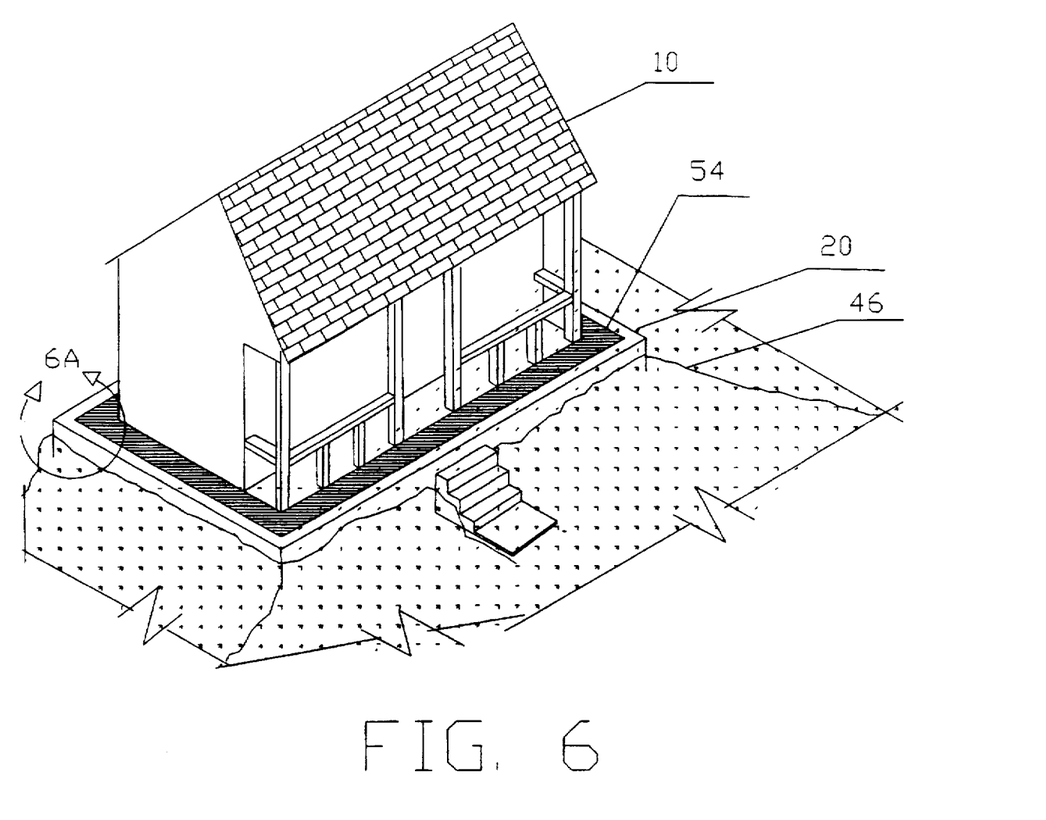
FIG. 6 shows the covering of the annular space (between house and shelter rim) when house is up.

Now referring to FIG. 6, what is shown is the house 10 at ground level, also shown is that the annular space between the house rim and shelter wall rim is provided a cover indicated at 54. The burmed-up soil 46 is appropriately shown also.

Figure 6A:
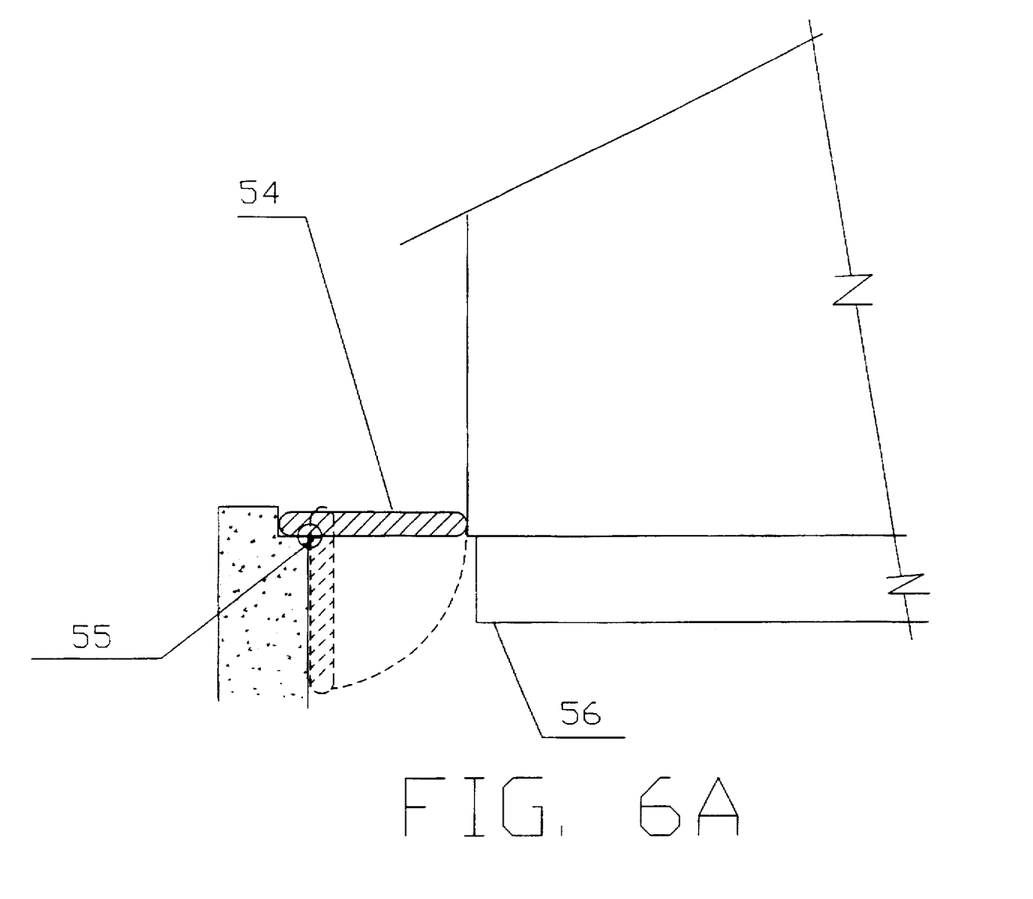
FIG. 6A shows a method of covering the annular space.

FIG. 6A is a detail taken from FIG. 6 and illustrates how the annular space covering 54 can be suspended by hinge 55 and be positioned in place with the house up, or hinged down and out of the way when house is lowered. Note that the annual space should be wide enough as not to interfere with any protrusions of the house!

Having thus described my inveniton, what I claim is:

1. A hurricane home shelter comprising:
    an open top concrete structure adapted to contain a building therein;
    said structure comprising:
        a) a fixed floor;
        b) opposed parallel side walls including footings disposed on said fixed floor;
        c) a building elevating means disposed on said fixed floor between said opposed parallel walls;
        d) said building elevating means being operable to selectively elevate and lower the building relative to said structure,
    said building elevating means comprises:
        a fixed base,
        a motion base, and
        a plurality of scissors-like sections connected intermediate said fixed base and said motion base.

2. A hurricane home shelter as defined in claim 2, wherein said fixed base includes:
    a) opposed parallel brackets on said fixed base, at least one of which is securely fastened to said fixed floor;
    b) opposed parallel structural links interconnected by said opposed parallel brackets to define a square and stable base;
    c) said opposed parallel structural links include a stationary pivot on one end and a sliding pivot on the opposite end; and
    d) the bottom of said plurality of scissors-like sections is connected to said stationary and sliding pivots of said fixed base.

3. A hurricane home shelter as defined in claim 2, including:
    a) an underground utility room adjacent to said structure;
    b) a steel ladder means for access from said utility room to said fixed floor;
    c) a control means for operating said building elevating means to raise or lower the building.

4. A hurricane home shelter as defined in claim 1, including:
    structure covering means
    said structure covering means comprises:
        a) a tarpaulin like cover means;
        b) a plurality of clamping bars for securing said cover means; and
        c) a plurality of brackets and wedges for securing said plurality of clamping bars.

5. A hurricane home shelter as defined in claim 4, including,
    an annular space between said side walls and said building in said structure;
    an annular space covering,
    said annular space covering comprises:
        a) a deck like covering which provides water/accident proof shielding of said annular space between said building and said side walls.

6. The shelter recited in claim 5 wherein,
    said deck like covering is hingedly attached to said side walls.

7. A hurricane home shelter as defined in claim 1, wherein said building elevating means includes:

a) second opposed parallel brackets on said motion base;

b) second opposed parallel structural links interconnected by said second opposed parallel brackets to define a square and stable base on said motion base;

c) said second opposed parallel structural links include a stationary pivot on one end and a sliding pivot on the opposite end; and d) the top of said scissors-like sections connected to said stationary and sliding pivots of said motion base.

8. The shelter recited in claim 1 including, a plurality of hydraulic cylinders connected to said opposed parallel structural links on said fixed base.

9. The shelter recited in claim 1 wherein, said motion base is detachably connected to building foundation means of said building, support means within said structure wherein the building can be independently supported and disengaged from said motion base.

10. A hurricane shelter for a structure comprising, a fixed floor;

a plurality of side walls mounted at said fixed floor to define an enclosure; and elevating means disposed on said fixed floor and substantially surrounded by said side walls within said enclosure;

said elevating means selectively operable to raise and lower the structure relative to said enclosure;

said elevating means includes a fixed base securely fastened to said fixed floor a motion base detachably connected to said structure; and said elevating means includes at least one scissors lift section connected to said fixed base at the bottom thereof and to said motion base at the top thereof.

11. The shelter recited in claim 10 including, sump means within said enclosure to selectively remove water therefrom.

12. The shelter recited in claim 10 including, quick disconnect means for all utilities in said structure, living quarters disposed adjacent to said structure;

a ventilation system connected to said structure;

an auxiliary electric power means within said structure;

watertight entry/exit means adjacent to said structure; and cover means for covering said entry/exit means.

* * * * *